US007661069B2

(12) United States Patent
Lindsay et al.

(10) Patent No.: US 7,661,069 B2
(45) Date of Patent: Feb. 9, 2010

(54) SYSTEM AND METHOD FOR VISUALLY EXPRESSING USER INTERFACE ELEMENTS

(75) Inventors: Donald J Lindsay, Mountain View, CA (US); Mark R Ligameri, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 11/094,109

(22) Filed: Mar. 31, 2005

(65) Prior Publication Data

US 2006/0224986 A1  Oct. 5, 2006

(51) Int. Cl.
*G06F 3/048* (2006.01)
(52) U.S. Cl. .................. 715/767; 715/764; 715/765; 715/766; 715/768
(58) Field of Classification Search .......... 715/764, 715/765, 766, 767, 768; 345/418, 419, 428, 345/581, 611, 618, 619, 650, 660, 664
See application file for complete search history.

(56) References Cited

U.S. PATENT DOCUMENTS

| | | | |
|---|---|---|---|
| 5,412,776 A | 5/1995 | Bloomfield | |
| 5,499,334 A | 3/1996 | Staab | |
| 5,668,962 A | 9/1997 | Kitami | |
| 5,838,317 A * | 11/1998 | Bolnick et al. | 715/764 |
| 5,889,517 A | 3/1999 | Ueda et al. | |
| 6,025,841 A * | 2/2000 | Finkelstein et al. | 715/803 |
| 6,043,817 A * | 3/2000 | Bolnick et al. | 715/788 |
| 6,160,554 A | 12/2000 | Krause | |
| 6,429,855 B2 | 8/2002 | Pabon | |
| 6,429,883 B1 | 8/2002 | Plow et al. | |
| 6,565,608 B1 * | 5/2003 | Fein et al. | 715/501.1 |
| 6,590,594 B2 * | 7/2003 | Bates et al. | 715/784 |
| 6,654,038 B1 * | 11/2003 | Gajewska et al. | 715/802 |
| 6,720,982 B1 | 4/2004 | Sakaguchi | |
| 6,781,611 B1 | 8/2004 | Richard | |
| 2001/0028368 A1 | 10/2001 | Swartz | |
| 2002/0044152 A1 * | 4/2002 | Abbott et al. | 345/629 |
| 2003/0151679 A1 * | 8/2003 | Amerson et al. | 348/231.6 |
| 2004/0066408 A1 | 4/2004 | Meyers et al. | |
| 2004/0255253 A1 * | 12/2004 | Marcjan | 715/789 |
| 2004/0261037 A1 * | 12/2004 | Ording et al. | 715/788 |
| 2006/0161861 A1 * | 7/2006 | Holecek et al. | 715/782 |

OTHER PUBLICATIONS

"Focus + Context Taken Literally," by Kosara, Miksch, and Hauser, published in Jan./Feb. 2002, pp. 22-29 in IEEE Computer Graphics and Applications.*
"Project Looking Glass" Sun Microsystems, Nov. 8, 2004, 9 pages, http://wwws.sun.com/software/looking_glass/.
"Exposé—Find the window you need. Now." Apple-Mac OS X—Features—Exposé, Nov. 2, 2004, 2 pages, http://www.apple.com/macosx/features/expose/.

\* cited by examiner

*Primary Examiner*—Sara Hanne
(74) *Attorney, Agent, or Firm*—Shook, Hardy & Bacon LLP

(57) ABSTRACT

A method of visually expressing user interface elements on a display is provided which emphasizes those user interface elements which a user would be more interested in and deemphasizes those user interface elements which a user would be less interested in. Certain user interface elements, such as active elements, can be rendered in a sharp manner and be within a depth of field while other elements, such as inactive elements, can be rendered in a blurry manner and outside the depth of field.

16 Claims, 8 Drawing Sheets

SYSTEM AND METHOD FOR VISUALLY EXPRESSING USER INTERFACE ELEMENTS

FIELD OF THE INVENTION

Aspects of the present invention are directed generally to the presentation of user interface elements in or with an operating system. More particularly, aspects of the present invention are directed to a method and system for applying the concept of depth of field in the presentation of user interface elements.

BACKGROUND OF THE INVENTION

As the use of computers in both the workforce and personal life has increased, so has the desire to allow for easier use of them. Many operating systems today utilize a windows based configuration of application programs. Information is displayed on a display screen in what appears to be several sheets of paper.

In existing environments application windows, the desktop and items on the desktop (e.g., icons representing folders, files, applications, etc.) form the core of user interface facilities for the graphical user interface (GUI) of computer systems. While these core facilities can vary in appearance across systems, they have multiple attributes in common. For example, application windows typically have a title bar including window management controls such as a "close" button to dismiss the window, the ability to resize or reposition the window, and the ability to coexist with other windows from the same application or different applications. GUIs which allow for desktop icons also allow such icons to be resized or repositioned. Additionally, the desktop picture or background image for user interfaces can be changed from a default picture or image to another image based on user preferences.

Collectively, the core facilities are presented on screen in a layered manner called a Z-order based on a set of common rules in what is referred to as a "Z-order". For example, the desktop picture or background image is generally presented at the bottom, behind or below other user elements stacked or layered on top the picture or image. The desktop elements remain at the bottom of the stack while the application windows can change their position in a visual stack based on which application window is active and in focus. Thus, when multiple application windows are open on a GUI, the active window is at the top of the Z-order while the remaining windows are inactive and located below the active window in the Z-order. However, in certain instances windows may be rendered side by side such that the user looking at the display may have difficulty in determining which of the windows is active.

In GUIs today, each user interface (UI) element (i.e. text, controls, frames, etc) in the various user interface facilities is rendered in a sharp, crisp manner. Visual techniques to aid in illustrating the layering (Z-order) have included addition of 'drop shadows' (on windows) and the use of different visual representations of active and inactive states. When multiple application windows are open on a GUI, each window, whether active or inactive is rendered in a sharp, crisp manner. In the Windows XP Brand operating System by Microsoft Corporation of Redmond, Wash., when a window is active, the title bar is a bright blue and when a window is inactive the title is pale blue; in both cases the window content is sharp and crisp. In the Mac OS 10 operating system by Apple Computing, Inc. of Cupertino, Calif., when a window is active the title bar is opaque and when a window is inactive the title bar is marginally transparent; in both cases the window content is sharp and crisp. Both Windows XP and Mac OS 10 represent the active and inactive states in a rather subtle manner, which some users may not appreciate, which can lead to difficulty in determining which window is active.

While various visual techniques exist to represent the active and inactive states of UI elements, some users may not readily be able to determine which elements are active and inactive. Accordingly, it would be helpful to provide a further visual indication as to the states of UI elements.

SUMMARY OF THE INVENTION

There is therefore a need to provide a further visual indication as to the states of the UI elements to allow users to quickly and easily determine which UI elements are active and which UI elements are inactive.

According to one aspect of the invention, an alternative expression is provided to identify which user interface element(s) is active. In this aspect, the active user interface elements are rendered in a sharp, crisp manner and in the depth of field, whereas the inactive user interface elements are rendered in a blurry manner and outside the depth of field. In one implementation, the Z-ordering of the user interface elements remains the same even when the active states of the user interface elements changes. That is, the focal point can be moved in response to a system or user initiated command, and the depth of field remains the same.

In another aspect of the field, the depth of field can be defined to cover a single user interface element or multiple user interface elements. The depth of field can be configured by the user by providing a command, such as keyboard command, or manipulating an on-screen control.

In other aspects of the invention, a specific UI element or facility can be highlighted during a system initiated task. System initiated tasks can include notification of error conditions or other alerts/notifications associated with an application. For example, when an active application needs to alert/notify a user of actions that need to be taken in response to an error condition, an alert dialog may be rendered sharply and within the depth of field over the application window when the error condition has been detected and the other user interface elements can be rendered blurry and outside the depth of field. In another aspect, the depth of field can represents a transient state identifying permissible and impermissible user interface elements in which the user can interact with at the current time.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Illustrative Operating Environment

Figure 1:
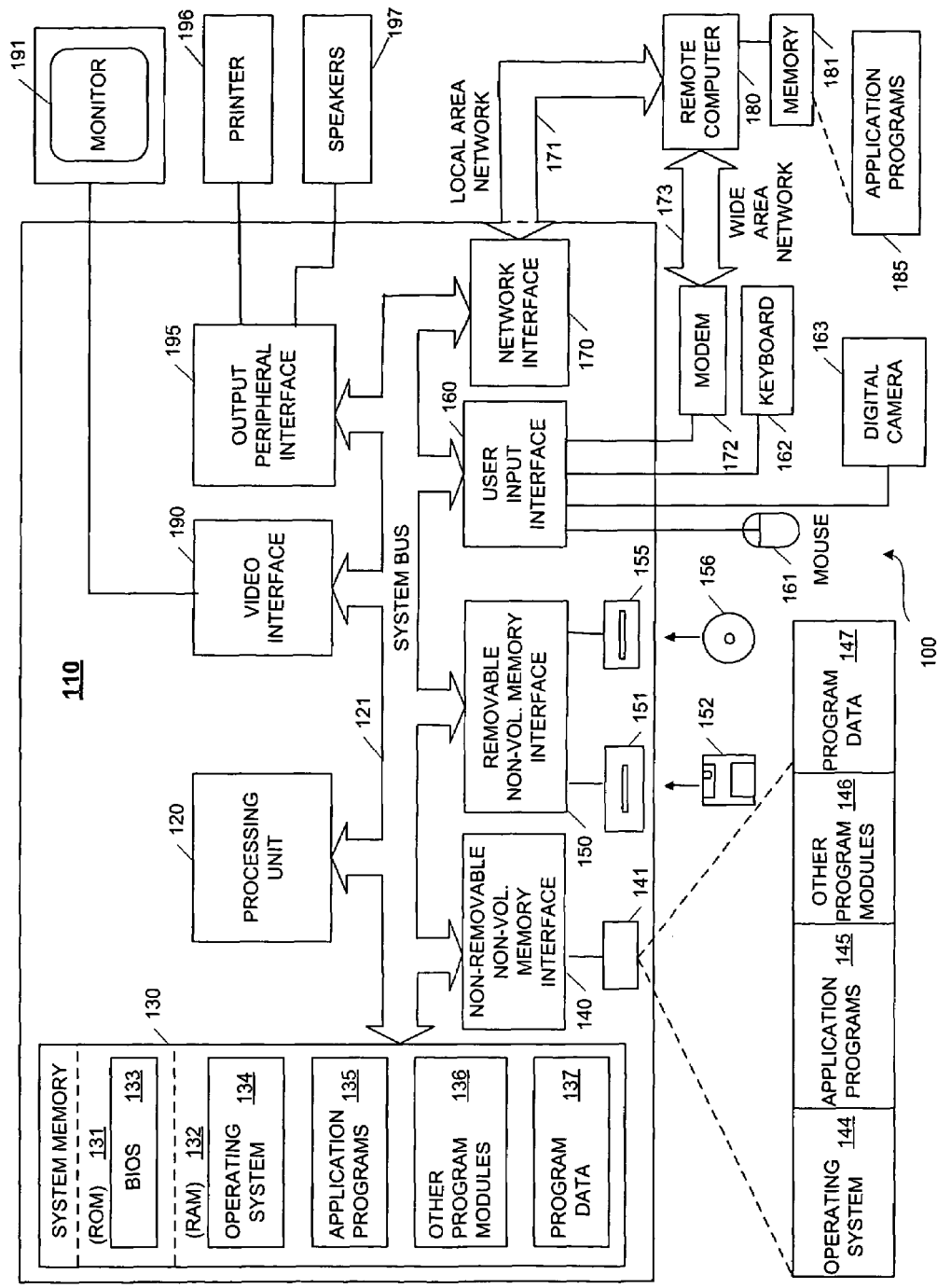
FIG. 1 illustrates a schematic diagram of a general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Illustrative Embodiments

To assist in describing aspects of the invention, the term "depth of field" will be borrowed from the field of photography. "Depth of field" is defined as "the region over which objects in an image appear sharp". In photography, depth of field is affected by a number of factors including: the lens aperture, subject distance, focal length, and film or sensor format. A larger aperture (smaller f-number, e.g. f/2) has a shallow depth of field. Using a large aperture, objects behind or in front of the main focal point will appear blurred. A smaller aperture (larger f-number, e.g. f/11) has a greater depth of field. When using a small aperture, objects within a certain range behind or in front of the main focal point will also appear sharp.

Photographers manipulate the depth of field to increase or decrease the region or object(s) in an image which appears sharp (in focus). Regions or objects outside of the depth of field will appear blurred (out of focus). Photographers apply this technique to highlight or emphasize a specific region or object in the image.

Aspects of the present invention involve applying the concept of depth of field to the context of a GUI, and more particularly to the UI elements of a GUI. For purposes of this disclosure, applicants will use the terms "in focus" and "out of focus" to refer to the meaning attributable to those terms in the photography art rather than referring to the meaning of those terms in the traditional computing context unless otherwise specified.

Figure 2:
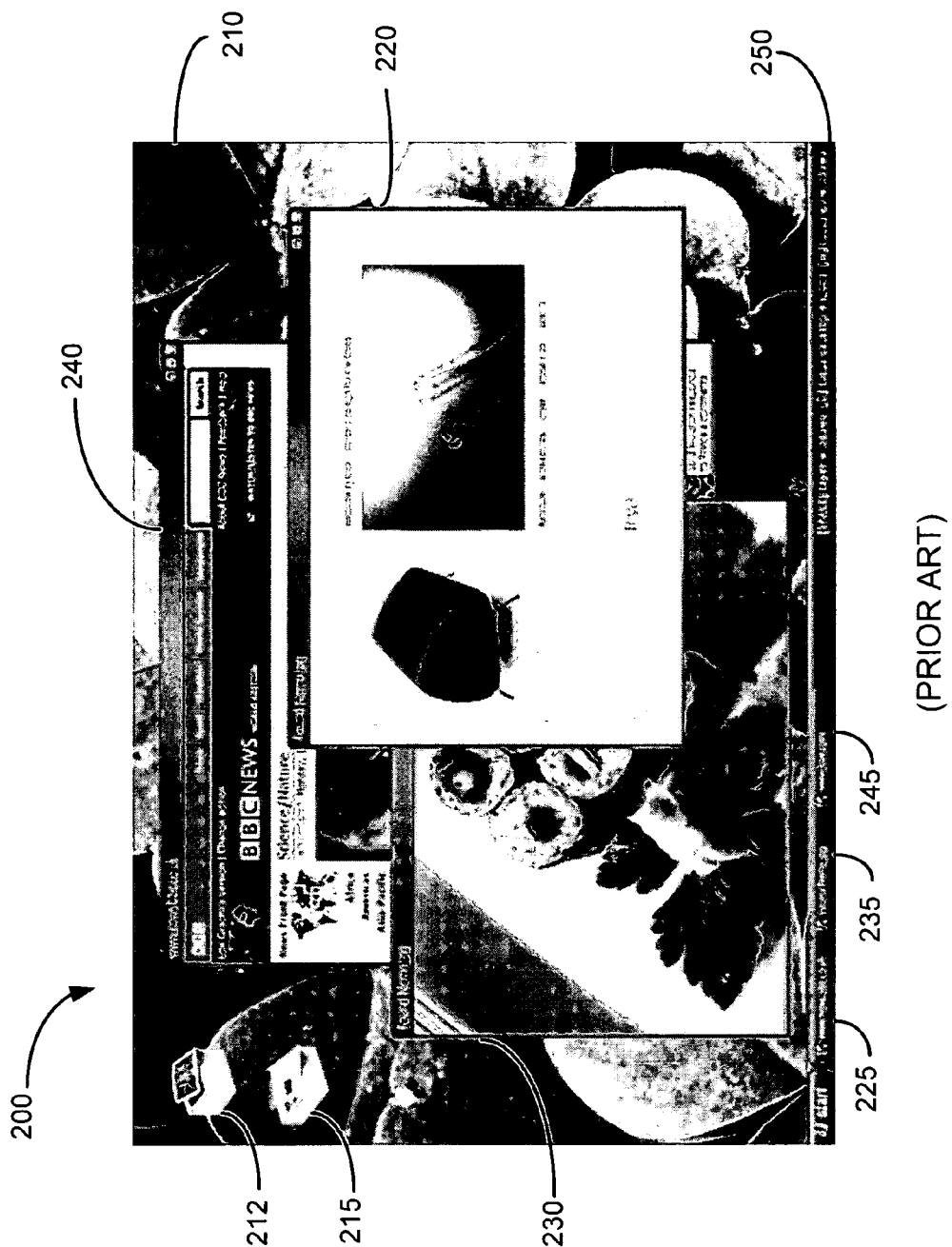
FIG. 2 illustrates a display screen showing a plurality of user interface elements rendered in a conventional manner.

In conventional computing systems, each UI element (i.e. text, controls, frames, icons, dialogs, notifications, desktop wallpaper, pointers, etc) in the GUI is rendered in a sharp, crisp manner. FIG. 2 shows an illustrative conventional display screen 200 with desktop 210, windows 220, 230 and 240 and taskbar 250. The space on the desktop 210 is an area of the display screen 200 that allows for the display of UI elements such as windows which correspond to application programs and also can include items, such as items 212 and 215. FIG. 2 shows three open windows 220, 230, and 240 which each overlap the desktop 210. The taskbar 250 is a specific implementation of an on-screen window remote control used to list and enable manipulation of windows, such as activating, moving, hiding, and minimizing. Each of the windows 220, 230 and 240 may be represented by a corresponding taskbar button 225, 235 and 245, respectively In FIG. 2, windows 220, 230 and 240 and the desktop 210 are shown in a Z-order orientation. Window 220 is higher in the Z-order than windows 230 and 240. Window 230 is higher in the Z-order than window 240. Window 240 is at the bottom of the Z-order of windows in this example and the desktop 210 is located at the bottom of the Z-order of user interface elements including the windows just below the desktop items 212 and 215. As shown in FIG. 2, the window at the top of Z-order is active and the underlying windows are inactive. As shown in FIG. 2 and as known conventionally, each of the UI elements in the Z-order, irrespective of whether the element is active or inactive, is displayed sharply and crisply, that is all elements are in focus.

Figure 3:
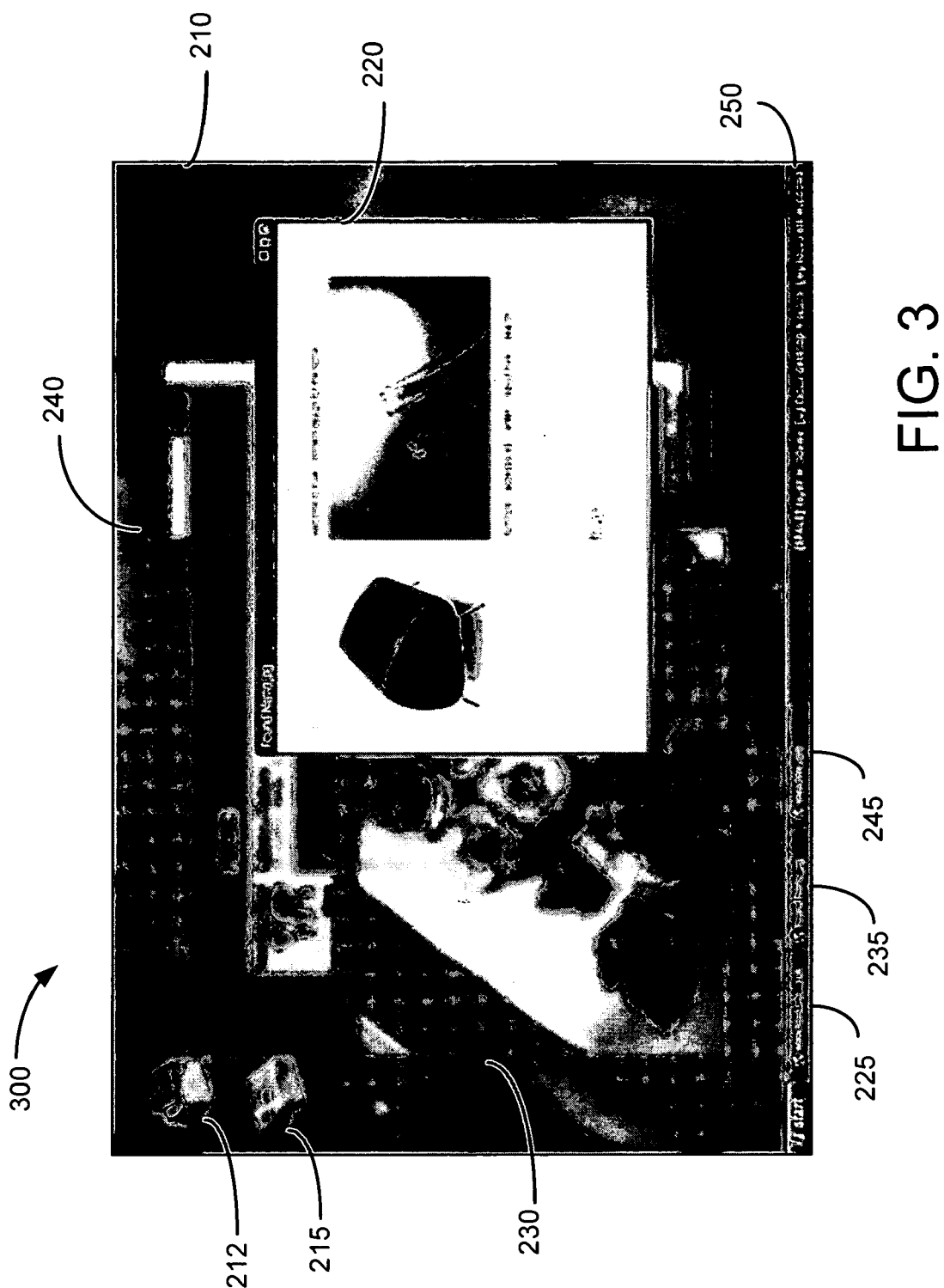
FIG. 3 illustrates a display screen showing a plurality of user interface elements rendered in accordance with one aspect of the present invention.

In contrast to a conventional GUI as depicted in FIG. 2, according to some aspects of the invention, the depth of field of an active UI element is set to be sharp and in focus, while the depth of field of inactive UI elements is blurred and out of focus. Blurring the inactive UI elements while presenting the active UI elements in a sharp crisp manner allows the user to easily identify, the UI elements which are active. FIG. 3 shows an illustrative display screen 300 of the invention, which applies the depth of field to identify an active application.

Referring to FIG. 3 from a photographer's perspective, the depth of field has been reduced such that less than all the UI elements in the overall Z-order are rendered sharply. Indeed in FIG. 3, the depth of field has been reduced to the point where only a single element is rendered sharply and in focus. Namely, in FIG. 3 only the window 220 is displayed sharply and in focus while other UI elements including windows 230 and 240, desktop 210 and desktop items 212 and 215 are blurred and out of focus. Thus, from a photography standpoint, one could analogize the visual representation rendered on the display screen 300 to represent an image having a small depth of field, where the focal point is on or proximate to the closest user interface element, namely the window 220 at the top of the Z-order. Continuing with this analogy, window 220 would fall within the depth of field while windows 230, 240, desktop 210 and desktop items 212 and 215 would fall outside the depth of field and be blurred and out of focus. For purposes of this invention, the term "depth of field" will be applied to Z-ordering of user interface elements.

One skilled in the art will appreciate that rendering UI elements in a blurred state and out of focus can be achieved by applying any well known blurring algorithm such as Gaussian blurring, where pixels in a specific region are sampled and averaged to create blurring in the region. For purposes of the present invention, a user should be able to readily visually differentiate the blurred UI element from a UI element which has been rendered in a sharp, crisp manner.

Figure 4:
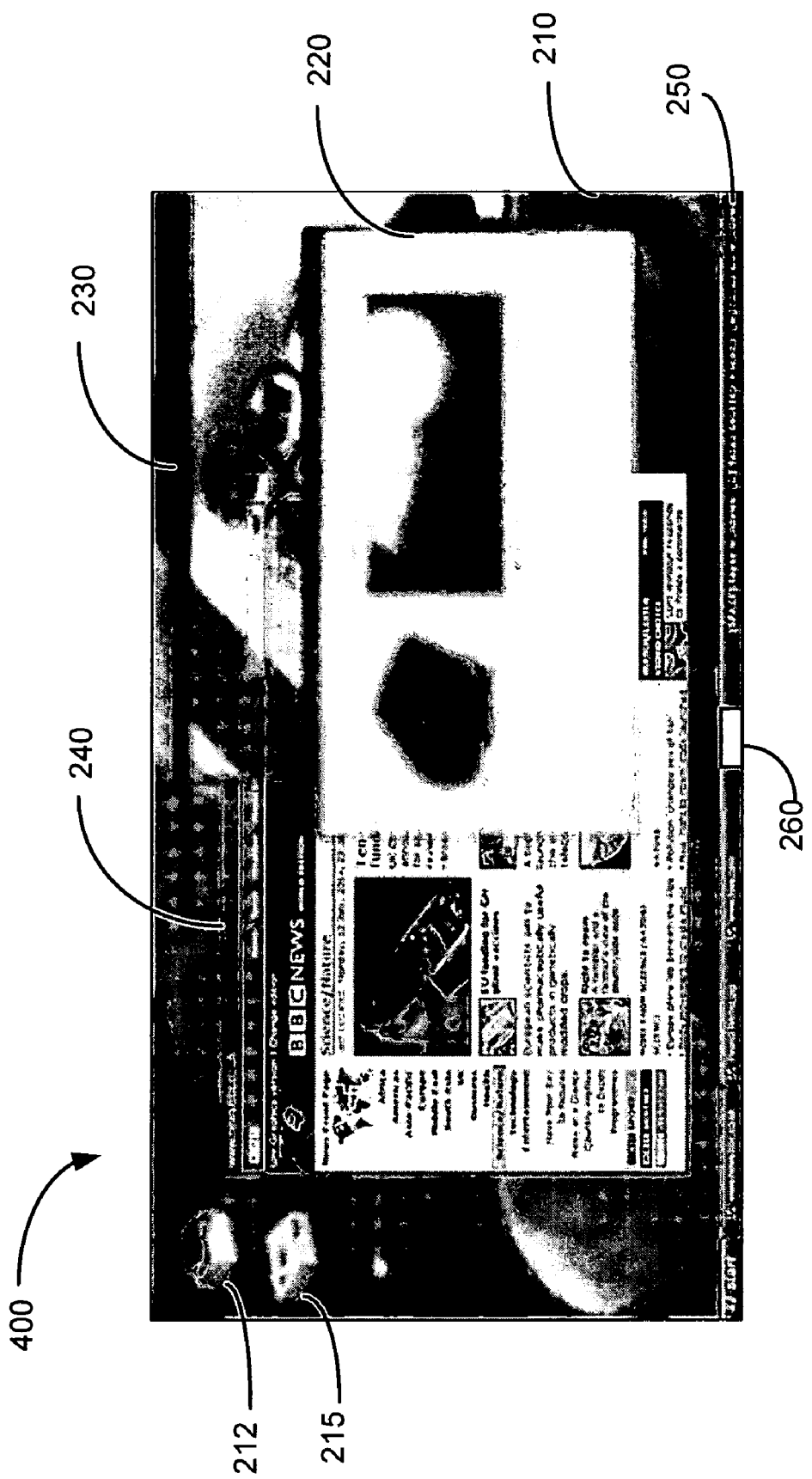
FIG. 4 illustrates a display screen showing a plurality of user interface elements rendered in accordance with another aspect of the present invention.

According to a further aspect of the invention, the focal point of the depth of field can be moved through the Z-order as illustrated in FIG. 4. For example, if the third application window 240 in the Z-order becomes active, it can be rendered sharply and the other UI elements, windows 220 and 230, desktop 210 and desktop items 212 and 215, can be rendered blurry and out of focus as illustrated in FIG. 4. Windows 230 and 240 have been located on a different portion of the display screen 400 in FIG. 4 then in FIGS. 2 and 3 for purposes of better illustrating the example shown. Analogizing to photography, the focal point has been moved to application window 240 with the same depth of field such that only application window 240 is rendered sharp while the other UI elements are rendered blurry.

Movement can be triggered by occurrence of a predefined condition or user action. For example, the focal point may be moved in response to a user clicking on a particular UI element such that the particular element can be activated and become sharp while the other UI elements can be blurred. Alternatively, a control could be provided on the display screen, for example the taskbar, such as control 260 in FIG. 4, which when selected can sequentially move the focal point through the Z-order. It will be appreciated that the control could also be a floating control. Alternatively, to browse to another of the windows, the user can issue a command by performing an action such as pressing the Tab key while continuing to hold the Windows key, spinning the mouse wheel one click or providing another input (e.g., voice command), where each command also causes the focal point to move in a predefined manner. It will be appreciated that browsing to another window may be implemented in response to a further user input or it may occur automatically (e.g., in response to a passage of time such as five seconds), for example in much the same way a scan operation functions with respect to a radio. In both cases, a command to browse and move a focal point is generated, in one instance by a user and in another instance automatically.

In certain illustrative implementations of moving the focal point according to the present invention, all user interface elements (e.g., open windows) substantially maintain their size, as well as their position in the Z-order. While not required, maintaining these parameters as described can minimize the impact of moving the focal point on the user's mental model of their workspace. As such, the user may be able to remember more easily the user interface element size and the position of the user interface element.

In other implementations, movement of the focal point can result in the movement of the user interface element(s) within the depth of field to the top of the Z-order. For purposes of understanding, a basic example with a window serving as a user interface element will be described. Conventionally, when a window among a plurality of windows is activated, the activated window moves to the top of the Z-order. Applying one illustrative implementation of the present invention to this behavior, activation of a window is tantamount to moving the focal point. In this implementation, the activated window moves to the top of the Z-order and is rendered sharply and in focus while the remaining inactive windows are rendered in a blurry manner out of focus.

In one of these implementations, when movement of the focal point occurs, the windows serving as user interface elements may be scaled and repositioned so that the windows in the visual stack (Z-order) increase in size from topmost to bottommost window. In such an implementation, the window at the top of the visual stack will always be scaled to be the smallest, the second window in the visual stack the second smallest and so on. Thus, in one implementation, when a command to move the focal point in the Z-order is executed, the windows in the depth of field can be moved to the top of the Z-order, and the windows previously above the windows now in the depth of field can move to the bottom of the Z-order and their size can increase with the bottom window being the largest window. Each successive window above the bottom window in the Z-order would be reduced in size, respectively, to allow for more content to be revealed for underlying windows. Such an implementation will allow many windows to be visually displayed in the visual stack and can provide a user with a comparable quantum of information regarding the content of each of the windows. In implementations where the user interface elements are moved, the movement of windows could be carried out by transitioning using animation.

Figure 5:
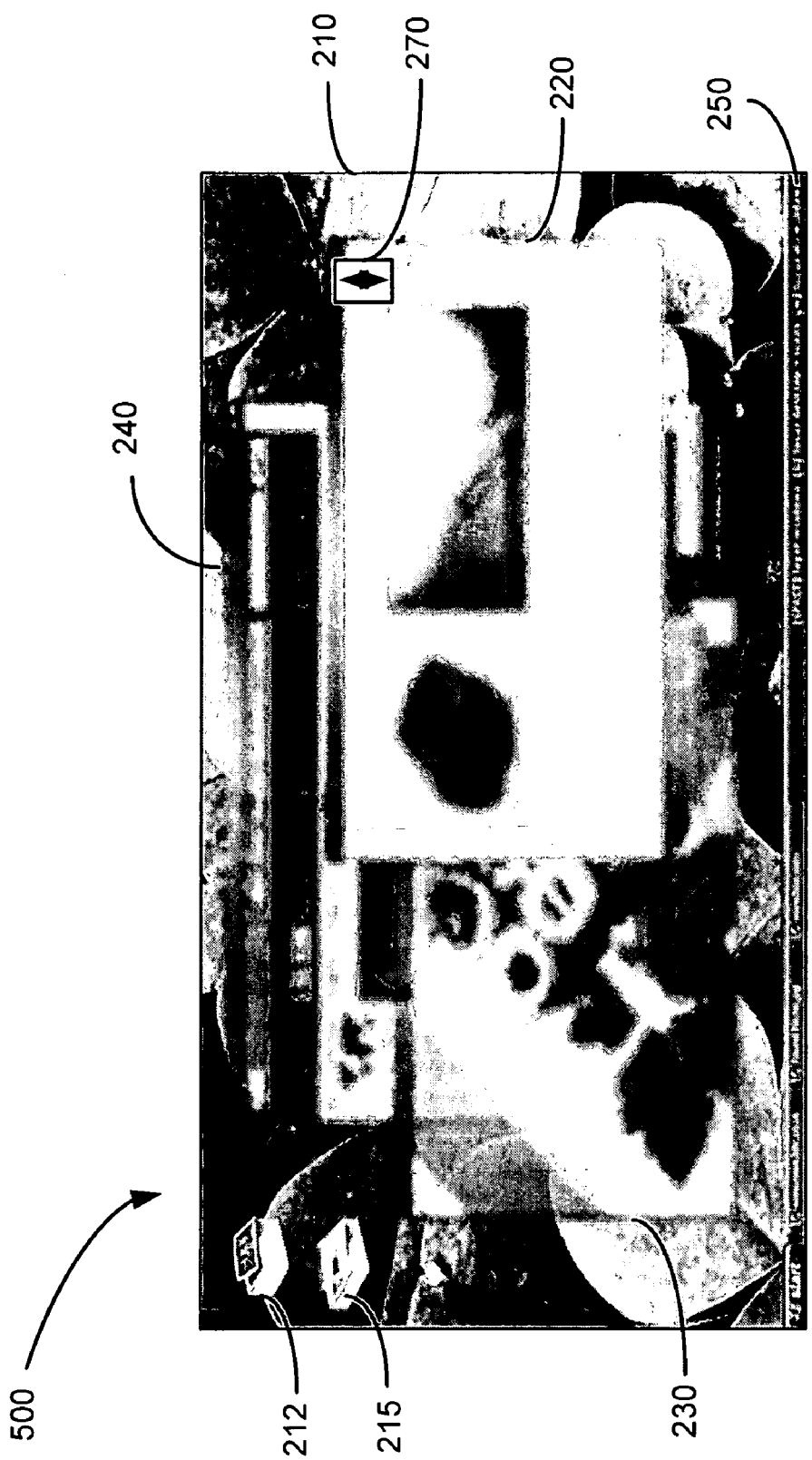
FIG. 5 illustrates a display screen showing a plurality of user interface elements rendered in accordance with still another aspect of the present invention.

The focal point can continued to be moved through the Z-order until the bottom element is in focus such as shown in the display screen 500 of FIG. 5, where the desktop 210 and desktop items 212 and 215 are rendered sharply while each of the windows 220, 230, 240 is rendered blurry and out of focus. In this example, the focal point can be view as being moved to between the desktop 210 and desktop items 212 and 215, such that the size of the depth of field has slightly increased enough to encompass both the desktop and desktop items. Alternatively, the rendering of the desktop items 210 and desktop items 212 and 215 could have been caused by a developer deciding that desktop 210 and desktop items 215 occupy the same plane in the Z-order.

According to some aspects of the invention movement of the focal point can occur in response to a predefined condition such as a system initiated task. For example, when an email message or appointment alerts is received, the focal point can move so that an email application or calendaring application window may be rendered sharply, while other application windows may be rendered blurry.

According to some aspects of the invention, the size of the depth of field is user configurable such that multiple windows could be presented sharply, for example three adjacent windows in the Z-order. In this case, assuming there are six windows rendered on the display screen with a Z-ordering, which may or may not be visually determinate, if the size of the depth of field encompasses three windows, then those three windows would be rendered in a sharp, crisp manner whereas the remaining windows would be rendered blurry and out of focus. If the user selects another window, then that window and two other windows in the Z-ordering (e.g., above or below, two above, two below, the desktop and desktop items), will be rendered sharply and in focus. The actual behavior of a scheme as to what UI elements are rendered in focus each time a user selects a UI element can be predefined by default settings or by user configuration. Preferably, the behavior of the scheme adapted will be intuitive, if not apparent, to a user. A control such as a slider control 270 shown in FIG. 4 may be provided to allow the user to set the size of the depth of field. The slider control 270 is shown as a floating control, but may be a fixed control and also may be set by, for example, rotating the scroll wheel of a mouse. The display may change the rendering in real time as the control is manipulated to give the user feedback as to the depth of field.

In other aspects of the invention, the depth of field behavior can be applied to highlight a specific UI element or facility during a system initiated task. System initiated tasks can include notification of error conditions or other alerts/notifications associated with an application. For example, when an active application needs to alert/notify a user of actions that need to be taken in response to an error condition, an alert dialog may be rendered over the application window when the error condition has been detected. Typically, the alert dialog provides the user with two or more alternatives for acting. In addition, it is not uncommon that a user must respond to the dialog, before the application window or other user interface elements may be activated. Consequently, it would be helpful, if the states of the various user interface elements could be made easy to understand. According to an illustrative implementation of the present invention, when a system initiated task occurs, the field of view could be set to include the alert dialog only. Namely, only the alert dialog would be rendered sharply, while the other dialogs would be rendered blurry and out of focus. As such, a user, through the rendering of the user interface elements, would get a clear sense that the alert dialog would need to be responded to prior to other user interface elements being available for further interactivity.

In another implementation of the present invention, depth of field can be applied to temporarily highlight selected objects during a system initiated task. For example, in response to a particular state of operation, the system can render sharply the user interface elements with which the user is permitted to interact (i.e., those elements will be in the depth of field) while rendering the other user interface elements blurry (i.e., those elements will be outside the depth of field) with which interaction is not permissible. Once the operation state changes, the system can then, as necessary, render sharply the user interface elements with which the user is permitted to interact while rendering the other user interface elements blurry with which interaction is not permissible.

One interesting example of temporarily highlighting a selected object to which the invention applies is in a drag and drop task, such as file copying. In this scenario, when a user selects an object like a folder in a file window by clicking on the object, the eligible target destinations (e.g., folders, desktop, etc.) would fall within the depth of field and be rendered sharply and ineligible destinations would be outside the depth of field and rendered blurry. In this type of scenario, the depth of field represents a transient state identifying permissible and impermissible user interface elements in which the user can interact with at the current time. The user could then drag the selected object (e.g., file) and drop it on the desired target destination (e.g., folder). This would allow the user to easily understand what target locations would be allowable for the file to be dropped on and copied to.

Figure 6A:
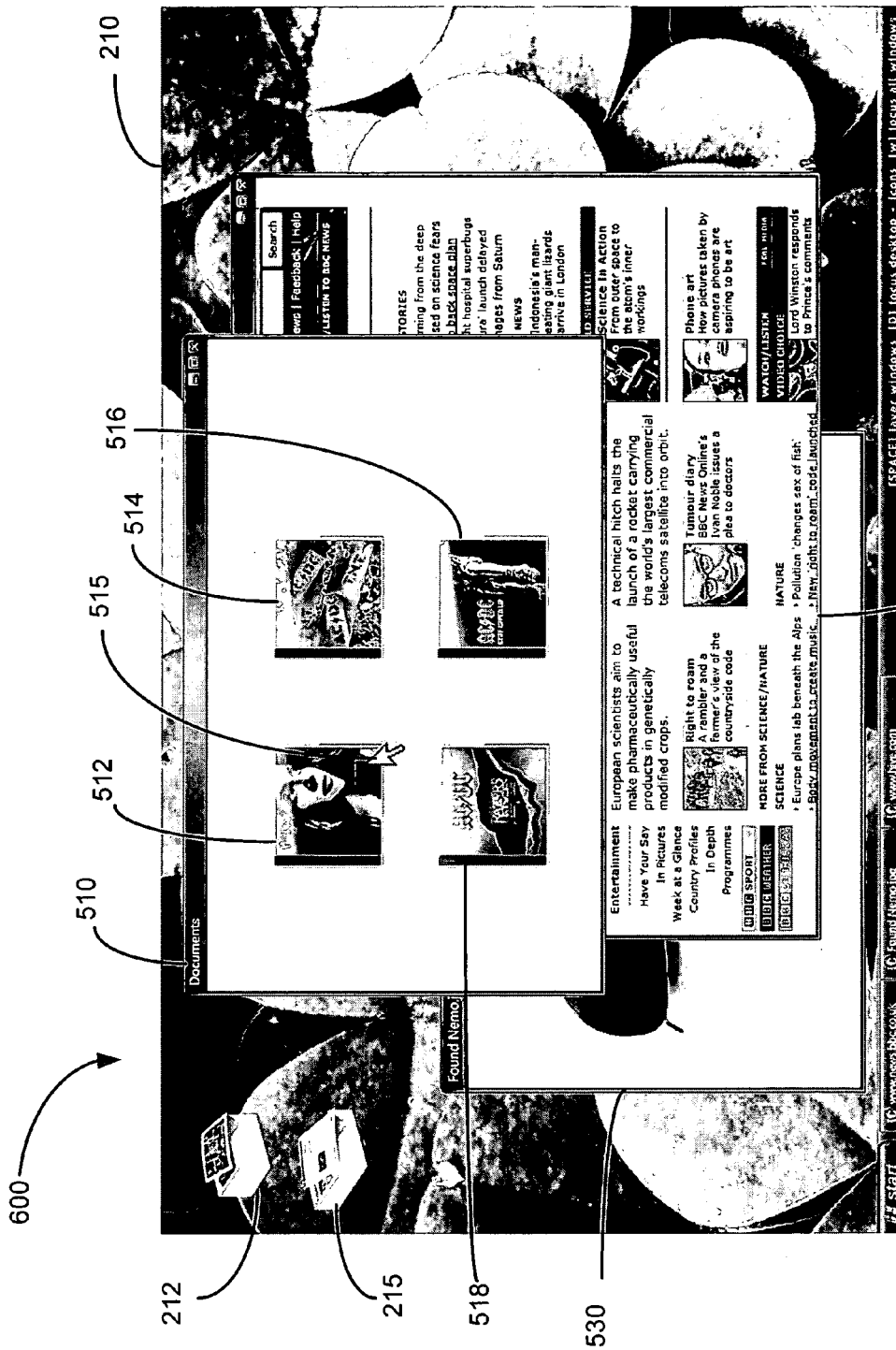
FIGS. 6A and 6B illustrate a display screen for assisting in describing a drag and drop operation in accordance with another aspect of the present invention.
Figure 6B:
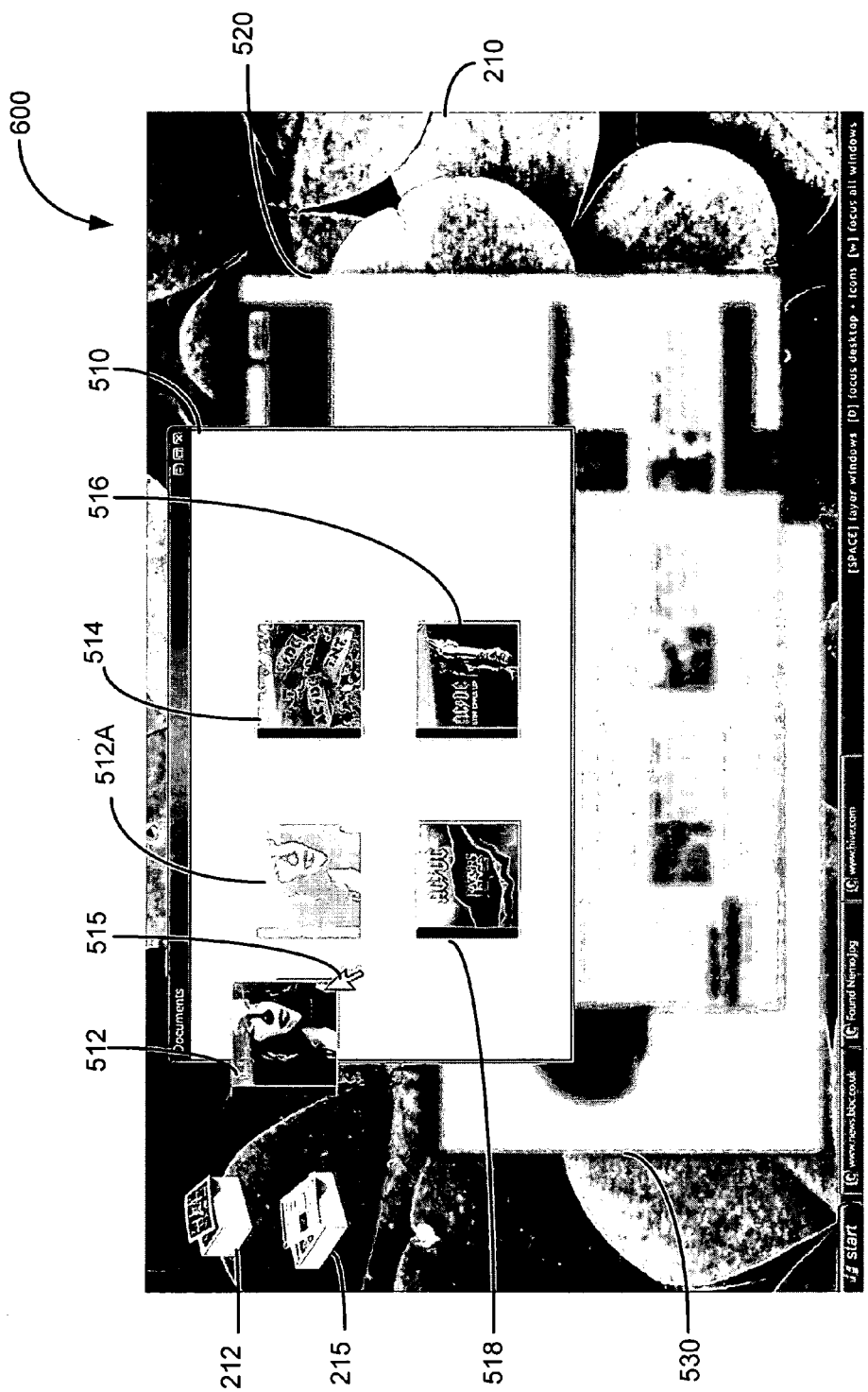

FIGS. 6A and 6B provide an example of the drag and drop task scenario. FIG. 6A shows a display screen 600 including desktop space 210, desktop items 212 and 215, window 510 including music files 512, 514, 516 and 518, pointer 515, and windows 520 and 530. In FIG. 6A, each of the user interface elements is rendered sharp and crisp. As shown in FIG. 6B, when a user selects music file 512 with pointer 515 and drags the music file 512, each of the eligible target destinations where music file 512 may be dropped is rendered sharply while the other user interface elements, which are ineligible target destinations, are rendered blurry. In this example, the eligible target destinations include the desktop space 210, desktop items 212 and 215, and music files 514, 516 and 518 in window 510. The user interface elements which are not target destinations for music file 512 include windows 520 and 530. The location from which music file 512 was spawned, music file 512A in window 510, is grayed out to represent the original location of the selected file. The grayed representation of music file 512A may be rendered sharply as the user could return the music file 512A to its original location or move the file within the window 510 rather than copy music file 512 to another file location.

Figure 7:
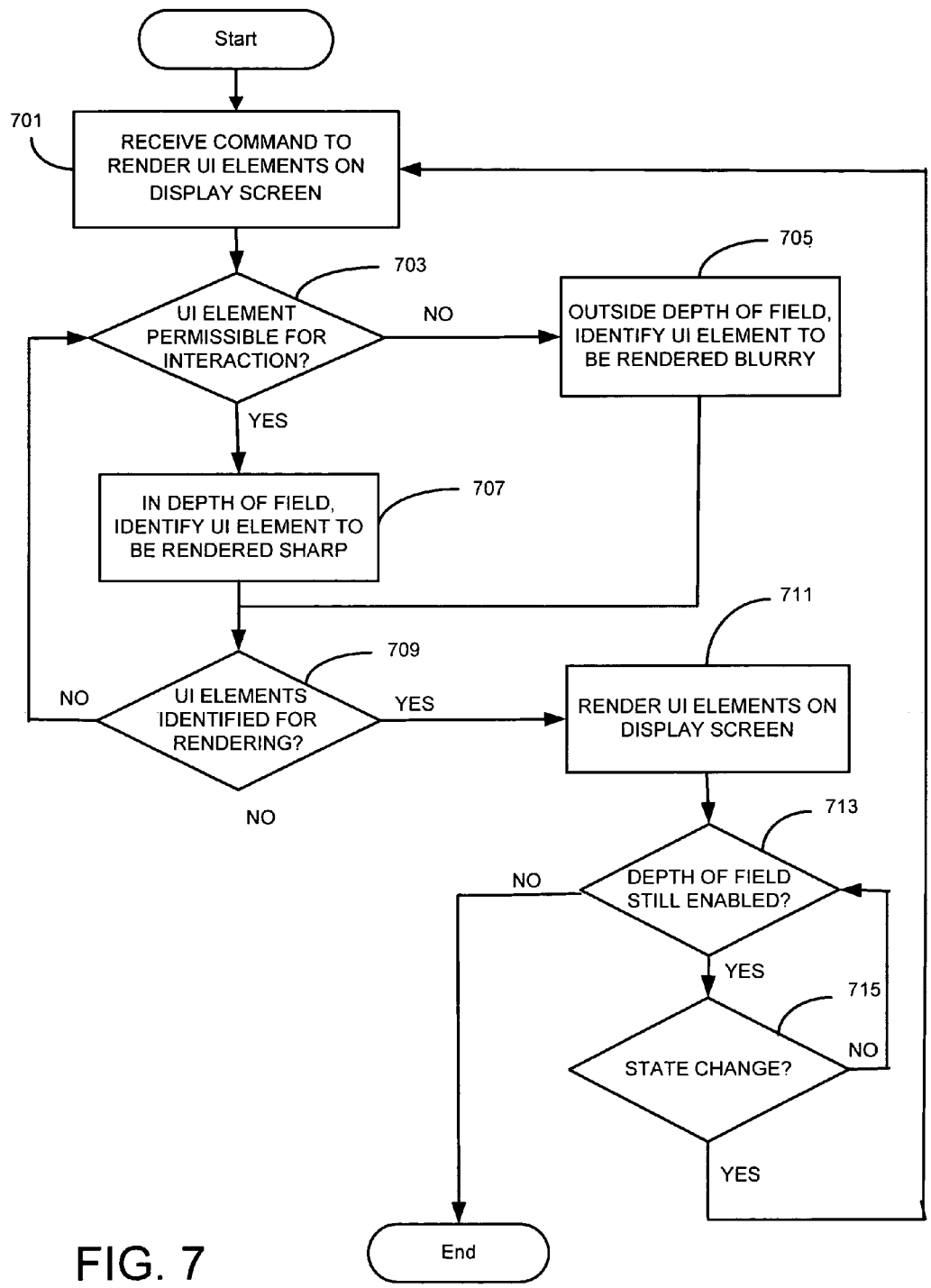
FIG. 7 provides a flowchart of an illustrative example of implementing the present invention.

FIG. 7 provides a flowchart showing the steps involved in an illustrative implementation of the present invention, where the user interface elements that a user is permitted to interact with are in the depth of field and rendered sharply and those which the user cannot currently interact with are outside the depth of field and rendered blurry. In step 701, the operating system receives a command to render UI elements on the display screen. In step 703, it is determined whether each UI element is permissible for interaction at the current time. If not, then that UI element falls outside the depth of field and is identified to be rendered blurry in step 705. If a UI is determined to be permissible for interaction at the current, then at step 707, that element is in the depth of field and identified to be rendered sharply. From both steps 705 and 707, control continues at step 709, where it is determined whether all the UI elements have been identified for rendering. If not, control returns to step 703 and steps 705 or 707 are repeated as appropriate. If all UI elements have been identified for rendering then they are rendered in step 711. Next, it is determined whether the depth of field functionality is still active in step 713; a user or potentially the system can disable the functionality under preset condition, such as in response to a system event. If not, then the process ends. If the depth of field functionality remains enabled, then in step 715 it is determined whether the state has changed such as in response to a user action or system initiated task. If so, then control returns to step 701 where the process repeats. If not, then control returns to step 713.

It will be appreciated that the present invention may be used in combination with other concepts disclosed by applicants in the following applications: U.S. patent application Ser. No. 11/036,612, filed Jan. 18, 2005 and entitled "System and Method for Controlling the Opacity of Multiple Windows While Browsing" and U.S. patent application Ser. No. 11/036,611 filed Jan. 18, 2005 and entitled "System and Method for Visually Browsing Open Windows" which are herein incorporated by reference.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for concurrently displaying a plurality of user interface elements on a display screen, the method comprising:
   presenting a plurality of user interface windows in a Z-order orientation on the display screen, the plurality of user interface windows comprising at least a first user interface window and a second user interface window;
   determining that a first user interface window is active and that a second user interface window is inactive, wherein the first user interface window and the second user interface window are presented in independent graphical user interface windows in a Z-order orientation on the display screen;
   based on the first user interface window being active, rendering the first user interface window in a sharp, crisp manner;
   because the user is not permitted to interact with the second user interface window, rendering the second user interface window in a blurry manner; and
   scaling the size of each of the plurality of windows in the Z-order orientation so that the size of each window increases from topmost to bottommost in the Z-order orientation; and
   displaying a slider control that allows a user to selectively change the number of user interface windows presented in a clear, crisp manner.

2. The method of claim 1, wherein the first user interface window is within a depth of field and the second user interface window is outside the depth of field.

3. The method of claim 2, wherein the depth of field is user configurable.

4. The method of claim 1, wherein the first user interface window is at the top of the Z-order of the user interface windows.

5. The method of claim 1, wherein after rendering the first and second user interface windows, the method further comprising responsive to a command, rendering the second user interface window element in a sharp, crisp manner and rendering the first user interface window in a blurry manner without changing the Z-order of user interface windows.

6. The method of claim 5, wherein rendering the first and second user interface windows in response to the command includes changing a focal point of a depth of field, wherein the second user interface window is within the depth of field and the first user interface window falls outside the depth of field, and wherein user interface windows within the depth of field are rendered in a sharp, crisp manner and user interface windows outside the depth of field are rendered in a blurred manner.

7. The method of claim 1, wherein the second user interface element is at the top of Z-order of the user interface windows.

8. The method of claim 1, further comprising rendering a third user interface window in a sharp, crisp manner.

9. The method of claim 8, wherein the first and third user interface windows fall within a depth of field and the second user interface window falls outside the depth of field.

10. The method of claim 8, further comprising:
    responsive to a command, changing the focal point of the depth of field, wherein the second user interface window is within the depth of field and at least one of the first and third user interface windows falls outside the depth of field;
    changing the presentation of the first user interface window from a sharp, crisp manner to a blurry manner;
    changing the presentation of the second user interface window from a blurry manner to a sharp, crisp manner;
    displaying a slider control that allows a user to selectively change the number of user interface windows presented in a clear, crisp manner; and
    based on the user manipulating the slider control, rendering the first user interface window in a sharp, crisp manner while contemporaneously rendering the second user interface window in a sharp, crisp manner.

11. The method of claim 10, wherein changing the focal point includes receiving a user input.

12. A computer readable medium having instructions stored thereon for performing the method of claim 1.

13. The method of claim 1, wherein the first user interface window is a system generated dialog.

14. The method of claim 13, wherein the system generated dialog is generated in response to an error condition.

15. The method of claim 1, wherein the first user interface window is an alert.

16. One or more computer-readable storage media having computer-useable instructions stored thereon, the computer-useable instructions configured to display a user interface, comprising:
    a display area rendering a control for a graphical user interface for setting a depth of field for rendering user interface windows,
       wherein
          a) a first user interface window is rendered in a sharp manner based on the first user interface element being active to a user,
          b) a second user interface window is rendered in a blurry manner based on the second user interface element being inactive to a user; and
    a slider control, displayed within the display area, that allows a user to selectively change the number of user interface windows presented in a clear, crisp manner.

* * * * *

UNITED STATES PATENT AND TRADEMARK OFFICE
CERTIFICATE OF CORRECTION

| | | |
|---|---|---|
| PATENT NO. | : 7,661,069 B2 | Page 1 of 1 |
| APPLICATION NO. | : 11/094109 | |
| DATED | : February 9, 2010 | |
| INVENTOR(S) | : Lindsay et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,661,069 B2 |
| APPLICATION NO. | : 11/094109 |
| DATED | : February 9, 2010 |
| INVENTOR(S) | : Donald J. Lindsay et al. |

It is certified that error appears in the above-identified patent and that said Letters Patent is hereby corrected as shown below:

In column 11, line 33, in Claim 1, delete "manner; and" and insert -- manner; --, therefor.

Signed and Sealed this
Tenth Day of May, 2011

David J. Kappos
*Director of the United States Patent and Trademark Office*